$d_1 < d_2$

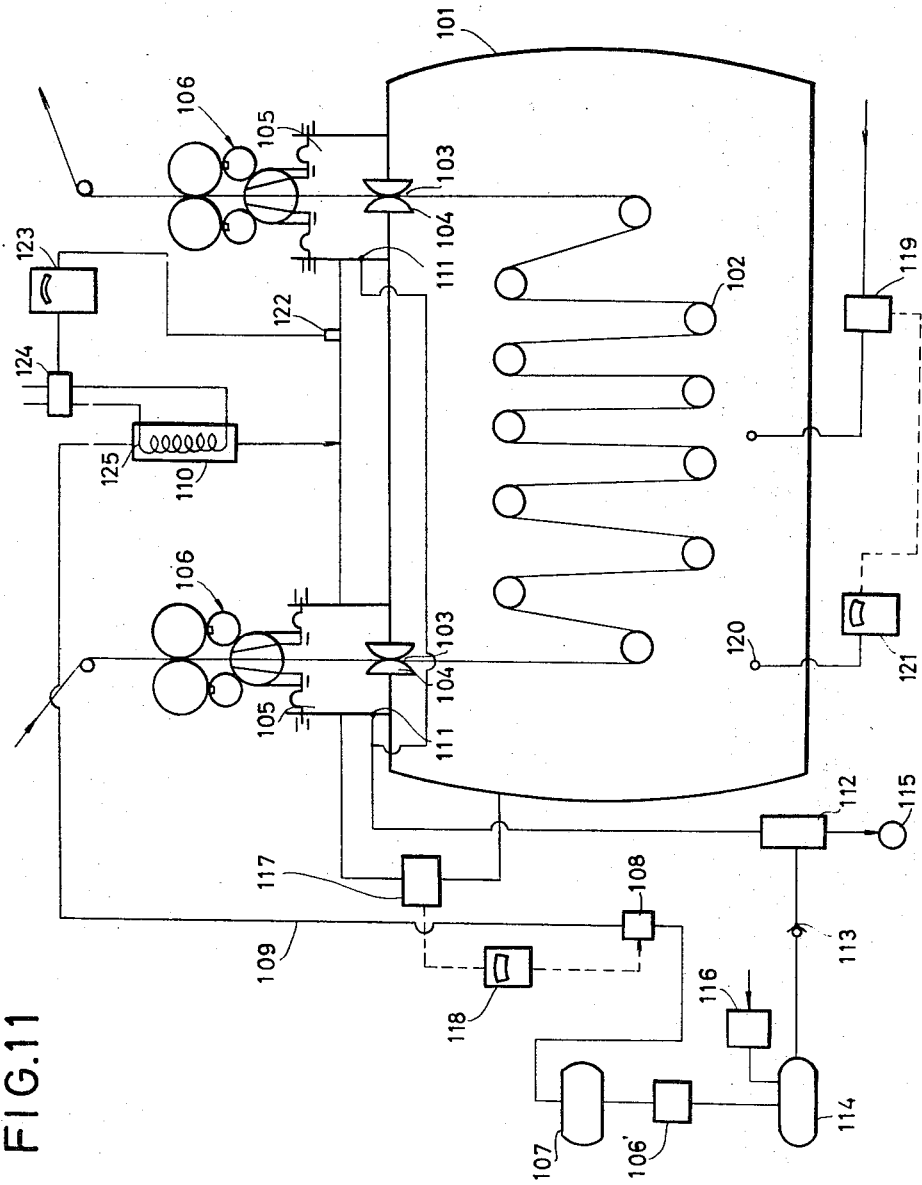

United States Patent Office 3,546,902
Patented Dec. 15, 1970

3,546,902
PRESSURE SEALING DEVICE IN A CONTINUOUS HIGH PRESSURE STEAMING APPARATUS
Yoshikazu Sando and Masao Takasu, Wakayama-shi, Japan, assignors to Sando Iron Works Company Limited, Wakayama-shi, Japan
Filed June 12, 1968, Ser. No. 736,479
Claims priority, application Japan, Aug. 28, 1967, 42/55,066, 42/55,067; Nov. 22, 1967, 42/75,051
Int. Cl. F26b *25/00;* D06f *39/00*
U.S. Cl. 68—5       8 Claims

ABSTRACT OF THE DISCLOSURE

A sealing device for the inlet and outlet of a pressurized chamber, for the chemical treatment of cloth, includes a sealing "drum" mounted on the pressure chamber through the medium of a flexible diaphragm or membrane and having a slot through which cloth enters or leaves the pressurized chamber. The cloth is fed into and out of the pressurized chamber by a pair of "soft" rolls, each having a soft covering on its exterior surface, the soft rolls engaging the cloth and gripping the same therebetween. Each soft roll is in driving engagement with a "hard" roll which, in turn, is in frictional sealing engagement with the "drum." Side sealing plates engage the ends of all of the rolls and are displaceable axially or transversely of the sealing "drum." Each of the soft and hard rolls is watercooled. The sealing arrangement may further include a high pressure air chamber interposed between the sealing device and the inlet or the outlet of the pressurized chamber, and the air in this air chamber is maintained at a pressure either equal to the pressure of treating fluid in the pressurized chamber or slightly lower than the pressure of the treating fluid.

BACKGROUND OF THE INVENTION

The present invention relates to a device for taking cloth into or out of a pressure chamber under air-tight conditions of an apparatus in which the cloth is chemically treated under high pressure and high temperature.

In the continuous high pressure steaming of cloth, particularly cloth made of synthetic fiber, namely when cloth is treated with continuous high pressure scouring, bleaching, dyeing and the like, it is necessary to take the cloth continuously from the air into a pressure vessel for steaming or to take it continuously from the vessel.

SUMMARY OF THE INVENTION

The present invention relates to a novel pressure sealing device for a continuous high pressure steaming apparatus.

In accordance with the present invention, a sealing drum is mounted on a pressurized steaming chamber, there being one sealing drum at the inlet to the chamber and another at the outlet thereof. Each sealing drum is mounted on the chamber through the medium of a flexible diaphragm or membrane, and has cooperable therewith at least one pair of "soft" rolls, each provided with a soft covering. These soft rolls are in contact with each other to grip the cloth therebetween and, if necessary, a hard-surfaced roll is in contact with each soft-surfaced roll and in frictional sealing contact with the sealing drum. The contact lines between the sealing drum, the hard rolls and the soft-surfaced rolls form seals defining a sealing chamber through which the cloth enters and leaves the pressurized vessel. Preferably, the surfaces of the soft rolls are maintained out of frictional contact with the drum surface, by the interposition of the hard rolls, thereby preventing wear and tear, due to friction, on the soft coverings of the soft rolls.

Another object of the present invention consists in that soft rolls and hard rolls are cooled to increase the life of the apparatus, such as each roll, as much as possible and to eliminate bad influences on the cloth to be treated as well as to remove the spalling phenomena of soft coating layer and core of each soft roll.

Still another object of the present invention consists in that novel lubrication means between the side face of the soft roll and a sealing plate as well as between the hard roll and the sealing drum are provided to prevent wear and tear.

In accordance with a further object of the present invention, when the cloth is taken into or out of the treating vessel, a high pressure air chamber is interposed between the steaming chamber and the above-mentioned pressure interception apparatus. The pressure in the high pressure air chamber is made approximately equal to that in the steaming chamber. After the cloth leaves the pressure interception apparatus and passes through the high pressure air chamber, it is introduced into the steaming chamber and, as the cloth leaves the steaming chamber, it is introduced first into a high pressure air chamber and then is taken out through the pressure interception apparatus. Thereby, high pressure steam will never contact the roll sealing means, so that the soft rolls and the sealing portions are protected. In addition, there is no deleterious effect on the dyeing of the cloth. The high pressure air chamber can be constructed as a multi-stage air pressure chamber, with the separate stages being interconnected by slots or pressure interception means, and the air pressure being progressively stepped to lower values outwardly from the pressurized vessel.

For an understanding of the principles of the invention, reference is made to the following description of typical embodiments thereof as illustrated in the accompanying drawings.

BRIEF DESCRIPTION OF THE DRAWINGS

In the drawings:
FIG. 11 is a somewhat schematic view illustrating another embodiment of the invention in which a pressurized air chamber is interposed between the pressurized treating vessel and the sealing device.

DESCRIPTION OF THE PREFERRED EMBODIMENTS

Figure 1:
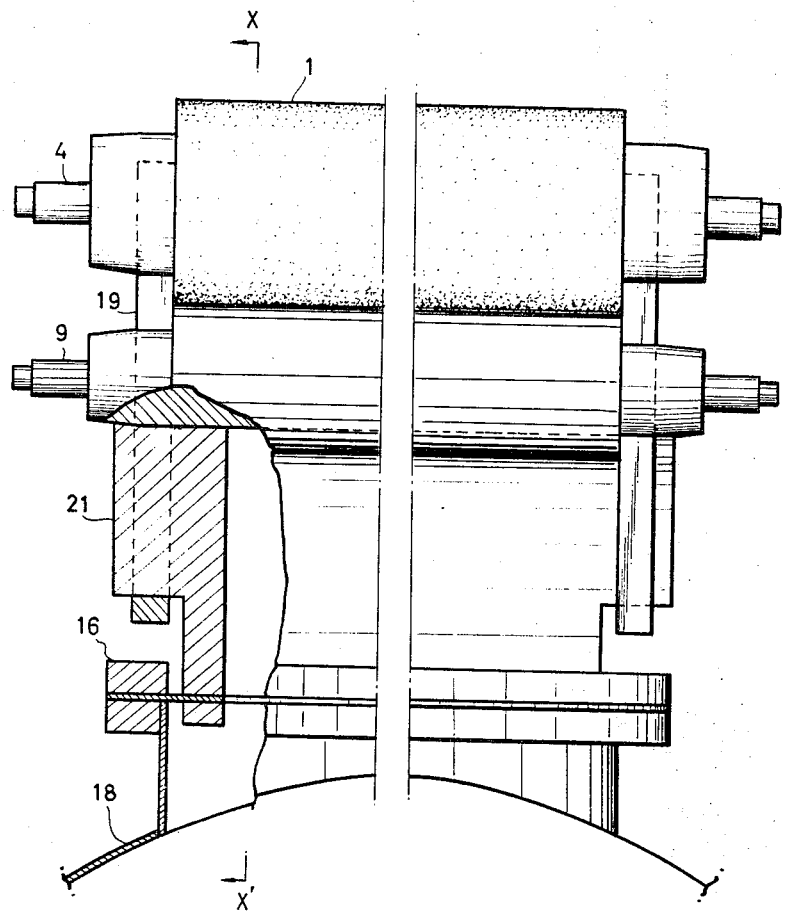
FIG. 1 is a front elevation view of a pressure sealing device embodying the invention.
Figure 2:
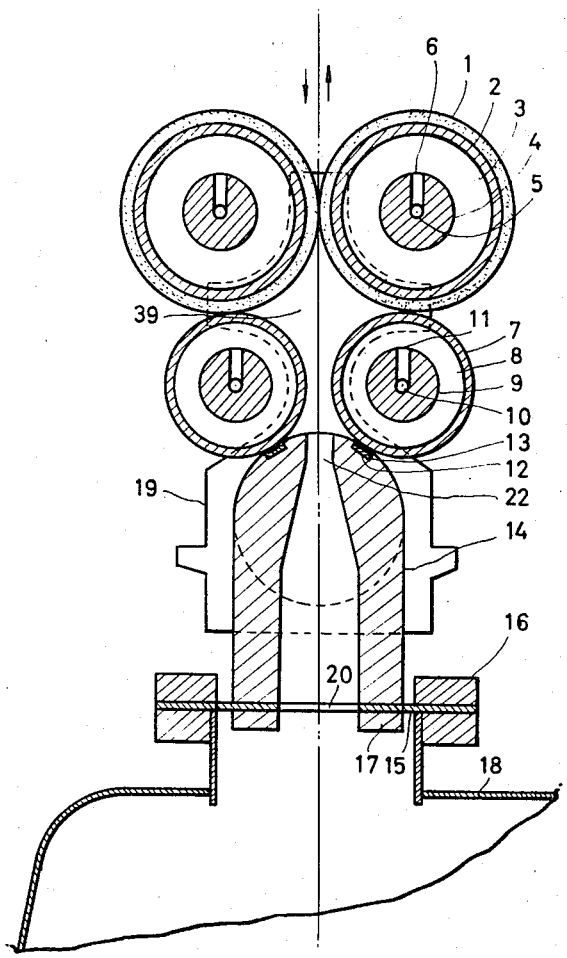
FIG. 2 is a transverse sectional view taken along the line X-X' of FIG. 1.

In FIG. 1 and FIG. 2, 1 is an outer shell made of soft rubber or the like, for a soft roll, 2 is an iron core of the soft roll, and a passage 3 for cooling water is formed between a shaft 4 of the soft roll and the iron core 2.

In the shaft 4 of the soft roll, an axial bore 5 for cooling water is provided and, at both ends of the shaft 4, there are provided passages for inlet and outlet of cooling water. On the side face within the passage 3 of the shaft 4, ports 6 leading from the bore hole 5 to the passage 3 are provided.

7 is an outer shell made of hard rubber, stainless steel, or the like for a hard roll, and 8 is a passage for cooling water formed between a shaft 9 of the hard roll and the outer shell 7. Within shaft 9, there are provided, ports 11 leading from an axial passage 10 to the passage 8, passage 10 opening on both ends for inlet and outlet of cooling water.

15 is a flexible membrane or diaphragm, one of which is provided at the inlet and another at the outlet of a pressurized vessel 18, as by being secured against flanges of the pressurized vessel by means of securing flanges 16. Each diaphragm or membrane 15 has an elongated opening 20 therein, and a sealing drum 14, having extending therethrough a passage 22 whose cross section corresponds to that of the opening or slot 20, is clamped to each membrane or diaphragm 15 by a clamping flange 17 secured against the opposite side of the diaphragm from that engaged by the sealing drum. Sealing drum 14 has a square shape with a cylindrical upper face, and its opposite ends are formed with cylindrical portions 21. The passage 22, for the cloth, expands downwardly from the upper face of sealing drum 14 and communicates with the opening 20 in each membrane 15, as shown in FIG. 1.

12 is a sealing piece having self lubrication properties, such as Teflon, and a groove 13 is cut on the sealing piece 12 for retaining lubricant such as rote oil.

Each hard roll 7 frictionally engages a respective sealing piece or member 12 on sealing drum 14, there being a clearance between the two hard rolls. Each soft roll 1 is in rolling engagement with a respective hard roll 7, and soft rolls 1 are in contact with each other. Sealing plates 19 engage the ends of the rolls 1 and 7 to complete enclosure of a space 39 defined by the soft rolls, the hard rolls and the sealing drum. The arrows in FIG. 2 illustrate the direction of feeding in the cloth to be treated and drawing out the treated cloth, these arrows being arranged alongside a dot and dash line which indicates the path of travel of the cloth.

As an alternative to the construction illustrated in FIG. 2, two pairs of hard rolls may be used, with the upper pair having a hard rubber surface engaging the surfaces of the soft rolls and the lower pair having stainless steel surfaces engaging the surfaces of the hard rubber rolls. The soft rolls and the hard rolls may be supported by hard sectional rolls.

The above mentioned sealing device operates as follows.

As shown in FIG. 1, gaseous medium, such as steam under pressure within the vessel 18, is sealed by (a) contact lines between the sealing pieces 12, on the sealing drum, and the hard rolls 7, (b) contact lines between the hard rolls 7 and the soft rolls 1, and (c) contact line between the two soft rolls contacting each other. The opening towards the sealing roll end of the space 39 enclosed by the contact lines is sealed by contact between the side sealing plates 19 and the roll end faces.

Figure 3:
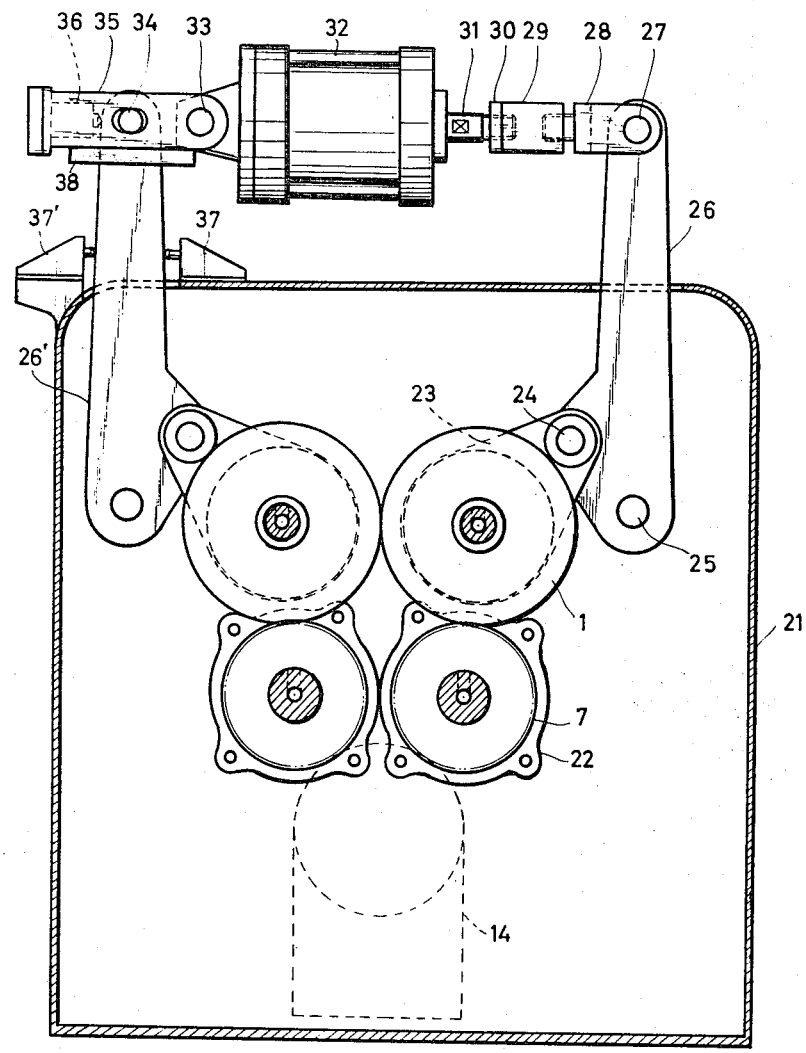
FIG. 3 is an end elevation view, partly in section, illustrating a nip adjusting means of the pressure sealing device.

As shown in FIG. 3, hard rolls 7 are attached to a frame 21 by means of bearing boxes 22, and soft rolls 1 are attached to bearing boxes 23. The bearing box 23 is attached to levers 26 and 26' by means of pins 24, so as to be able to pivot around these pins 24. The levers 26 and 26' are attached to the frame 21 by means of pins 25, and are interconnected by means of pins 27, 33 and 34, a joint 28, a turnbuckle 29, a piston rod 31, an air cylinder 33, a connector 35, and a load cell 36. The soft rolls 1 are mutually pressed together and, at the same time, pressed against the respective hard rolls 7. The load cell 36 will transmit these operating forces as electric signals to an indicator connected thereto to control unbalanced pressures of left the and right rolls, 38 is a slide for the connector 36, and 37, 37' are setters for determining the position of the lever 26' to fix the latter.

Figure 4:
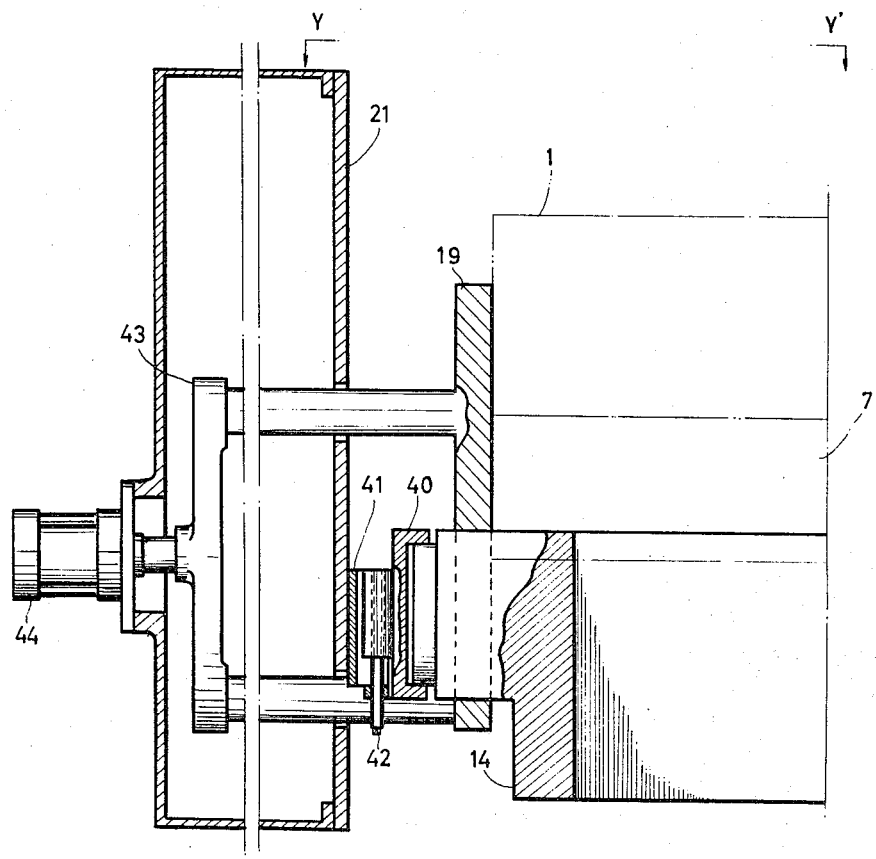
FIG. 4 is a front elevation view, partly in section, illustrating means for shifting the sealing drum vertically and also illustrating the pressing means for the side sealing members.

FIG. 4 shows a vertical shifting means for sealing drum 14 and pressing means for the end face sealing pieces 19.

In FIG. 4, 40 is a slide for supporting the sealing drum 14, 41 is a slide rail attached to the frame side, and 42 is a screw for shifting vertically and controlling of the slide 40, thus controlling the contact pressure of the sealing drum 14 against the hard rolls. The side sealing plate 19 is attached to a hydraulic cylinder 44 through an equalizer 43 and is uniformly pressed against the end faces of the shafts of the sealing rolls by oil pressure.

Figure 5:
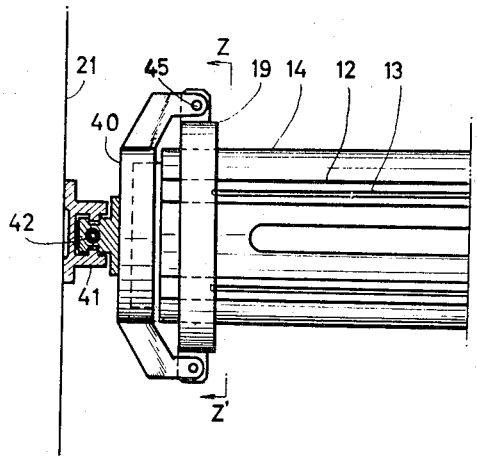
FIG. 5 is a partial plan view corresponding to FIG. 4.
Figure 6A:
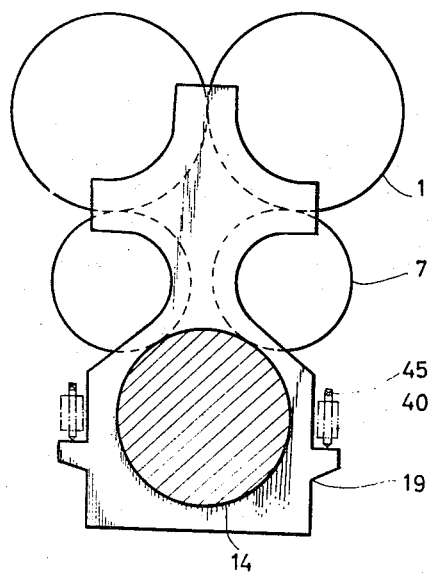
FIG. 6a is a sectional view taken along the line Z–Z' of FIG. 5.

FIG. 5 is a partial plan view illustrating the vertical shifting means for sealing drum 14 and FIG. 6a illustrates the relation between sealing drum 14 and the end sealing members 19, as viewed in the direction of line Z–Z' of FIG. 5.

Figure 6B:
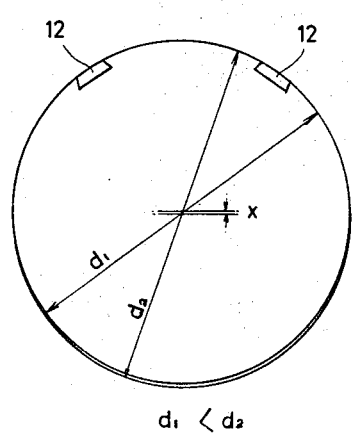
FIG. 6b is a end elevation view of the sealing drum illustrating the relation between the end sealing members and the sealing drum.

In these drawings, FIGS. 45 are screws for pressing the side sealing plates 19 against the sealing drum 14, and, as is clearly shown in FIG. 6b, the side sealing plates 19 must be pressed at a position lower than the axis of sealing drum 14 by the amount $x$, to prevent the leakage due to the difference between the bore diameters of the side sealing plate 19 and that of the shaft of the sealing drum 14. FIG. 6a is a view seen in the direction of the Z–Z' line in FIG. 5.

Figure 7:
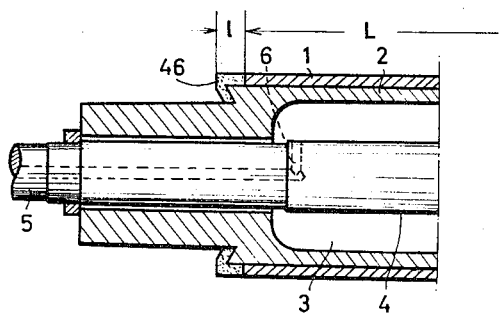
FIG. 7 is a partial axial sectional view of an end portion of a soft roll.

In the enlarged partial axial sectional view of the end of a soft roll 1 as shown in FIG. 7, a part L of the outer covering has no frictional engagement with elements cooperable with roll 1. Instead, an end part 46 is interposed between the axial end of part L and has frictional contact with the adjacent side sealing plate 19. Thus, while the major length L of the soft covering of roll 1 is made of soft material, an axially relatively short part $l$ is made, for example, of a material which has a high-wear-resistance with respect to rubber, or may be made of packing material which will reduce the frictional resistance. For example, the small part $l$ could be formed by blending molybdenum disulfide, short fibers of "Teflon," or the like.

Figure 8A:
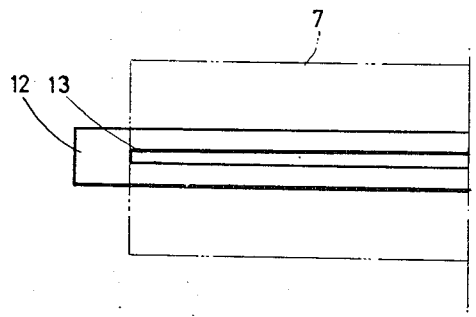
FIG. 8a is a partial plan view of the sealing drum, with parts illustrated in phantom.
Figure 8B:
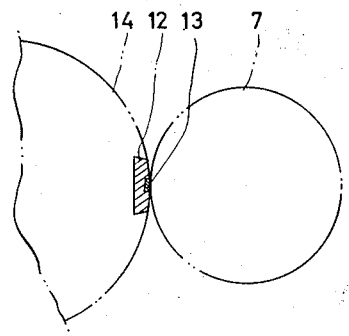
FIG. 8b is a sectional view, partly in phantom, of the engagement between the sealing drum and the hard roll.

FIG. 8a is a plan and FIG. 8b a cross section of a sealing piece 12, of which the portion contacting a hard roll 7 is provided with a groove 13, wherein, for instance, a fiber mass or a porous soft solid body impregnated with lubricant, which gives no trouble if it sticks to the substance to be treated, such as rote oil, is inserted to reduce the coefficient of friction of the hard roll 7.

Figure 9:
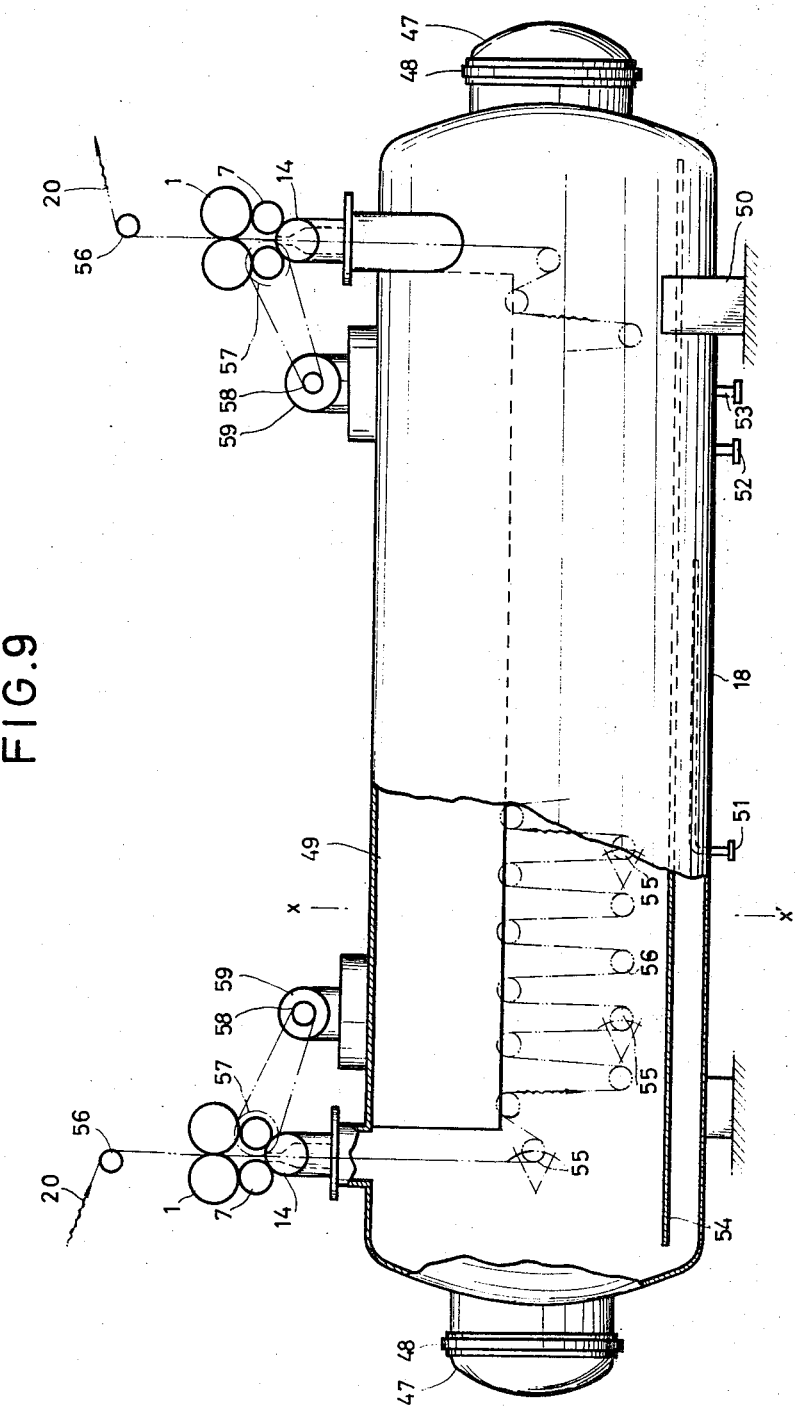
FIG. 9 is an elevation view, partly in section, illustrating the sealing device of the present invention as applied to a steamer for setting colors of cloth.

FIG. 9 is an example of a steamer for color forming of cloth, wherein the pressure sealing device according to the present invention is used.

Figure 10:
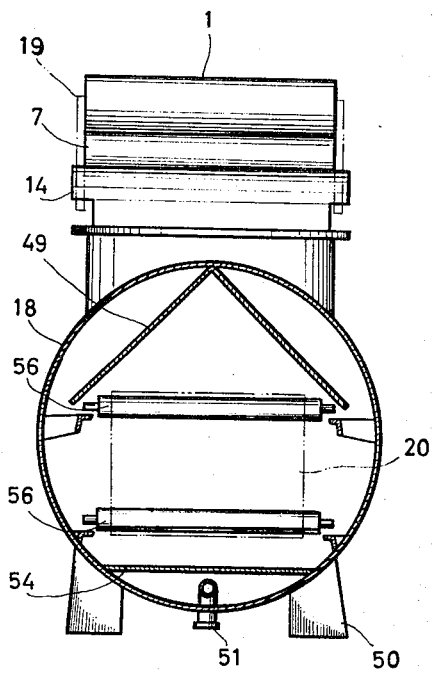
FIG. 10 is a sectional view taken along the line X–X' of FIG. 9.

FIG. 10 is a cross section along X–X' line of FIG. 9.

A cloth 20, which is padded with dyestuff, passes between nips of the soft rolls 1, of the sealing device at the inlet side, from a guide roll 56 and hangs on the first dancer roll 55 which is arranged in a vessel 18. Warp (expansion or contraction) of the cloth caused by sudden heating is absorbed by the action of the dancer roll and a constant tension is given. The color forming process will be effected at a predetermined temperature and in a predetermined time. The treated cloth is passed through the nip of the soft rolls of the sealing device at the outlet of the vessel 18. Within the vessel 18, the cloth passes over dancer rolls 55 and guide rolls 56, and the cloth is withdrawn continuously from the vessel.

59 is a driving motor for the sealing device 57. 58 are driving chain wheels and, by the action of dancer roll 55 arranged within the vessel, the feed speed of the cloth is automatically controlled, so that the cloth is taken in and out under a constant tension.

49 is a ceiling board (canopy) for preventing drainage, from the upper inner wall of the vessel, falling on the cloth, 54 is a porous plate (hurdle) for throttling the spray of water from a steam jet pipe 51. 52 is a blow pipe, and 53 is an over flow pipe for maintaining saturated water within the vessel to keep the steam therein always under the state of completely saturated steam. 50 is a leg of the vessel, 47 is a man hole, and 48 is a crutch portion of the man hole, being an opening for carrying parts or passing the cloth into the vessel or the like by workmen.

FIG. 11 is another example, wherein a high pressure air chamber is provided on the outside of the steaming chamber and a pressure interception equipment is provided on the outside of the air chamber to make the pressure of the high pressure air chamber approximately balanced with that of the pressure of the steaming chamber, so as to make said sealing device more effectively when the cloth is taken in and out therefrom. Thus the cloth is taken in from the pressure interception equipment and, after passing through the high pressure air chamber, it is led to the steaming chamber. When the cloth is taken out, it is led from the steaming chamber to the high pressure air chamber, and, after passing heretrough, it is taken out through the pressure interception equipment. 101 is a steaming chamber for high pressure steaming treatment of the cloth and is filled with steam. 102 are guide rolls for leading the cloth and, as occasion demands, some or all thereof are driven to effect steaming treatment of the cloth, while leading the cloth. 103 are slots passing of the cloth, provided at the on inlet and outlet on the side wall of the steaming chamber, and comprising drip preventing members provided on both sides of the cloth and two heating means 104 for the cloth.

The interiors of heating means 104 are generally supplied with steam at a higher temperature than the steam in steaming chamber 101. However, the surface temperature of the heating means may be maintained higher than the temperature of the steaming chamber by electric heating or by other heat sources. High pressure air chambers 105, each associated with a roll-type sealing device for pressure interception, such as shown in FIGS. 1–8b, communicate with the interior of chamber 101 through slots 103. Chambers 105 are supplied with air under pressure, and the pressure of the supplied air is so controlled as to either be substantially equal to the pressure within chamber 101 or to be slightly lower than the pressure within chamber 101. Air is supplied to high pressure air chambers 105 by an air compressor 106' which supplies the air to an accumulator, in the form of a high pressure air tank 107. The air is controlled to the proper pressure by an air pressure control means 108 which supplies the air to a line 109 from which it is delivered to high pressure air chambers 105 through constant temperature heating means 110. The air is discharged through ports 111 of the high pressure air chamber to flow through a condenser 112 and, through a check valve 113 and a low pressure air accumulator 114, to air compressor 106, the arrangement thus forming a closed air circulating system.

115 is an automatic drain discharge means which will automatically discharge the drainage generated by the condenser 112 out of the circulation system. 116 is a compressor for air supply to the low pressure air tank 114 and serves to replenish the leakage air from the roll sealing device.

117 is a means to detect the pressure difference between the high pressure air chamber 105 and the steaming chamber 101, and it will automatically operate air pressure control means 108, through a controller 118, to balance the pressure of the high pressure air chamber 105 with that of the steam pressure 101 or to make the former slightly lower than the latter.

A steam pressure control means 119 is inserted in the steam supply circuit of chamber 101, and a pressure detector 120 detects the pressure in the steaming chamber and, through a controller 121, automatically controls the operation of control means 119 to maintain the pressure at a predetermined constant value.

The heating device 110 maintains the temperature of the high pressure air in air chambers 105 at a constant value of approximately 100° C., and a temperature sensor 122 operates through a controller 123 to, in turn, operate control means 124 controlling the supply of electric energy to an electric heater 125. While an electric heater 125 is illustrated for the heating means 110, it will be appreciated that the heating means 110 could utilize any other medium such as steam, hot gas, or the like. The effect of the heating means 110 is to control the temperature of the high pressure air within chambers 105 so that steam ejected therein from chamber 101 may not abruptly cool and condense on the roll sealing equipment 106.

In the above embodiment, at the inlet and outlet of the high pressure steam chamber, a high pressure air chamber is provided on the outside of the steaming chamber, wherein the pressure of the air chamber is kept approximately equal to or slightly lower than the pressure within the steaming chamber. However, the high pressure air chambers may comprise multi-stage type chambers interconnected by slots or by pressure interception means. In a multi-stage type chamber, the air is supplied so that the pressure in the several stages decreases, in stepped fashion, from the chamber 101 to the exterior.

Thus, the construction of the present invention has been explained in details referring to the accompanying drawings, but when it is practically applied, the following various effects will be obtained, through which the present invention may be clearly understood.

(A) Material to be treated, such as cloth, sheet material or the like, is continuously supplied into a high pressure vessel and continuously withdrawn therefrom. As those portions of the soft rolls 1 contacting with the material to be treated do not have frictional contact with other portions of the sealing means or pressure intercepting means, the surfaces of the soft rolls are not damaged, so that a good pressure sealing is maintained. As there is no damage, due to frictional contact, to the surfaces of the soft rolls, the life of the soft roll is very substantially increased. The particular construction of the ends of the covering of the soft rolls is very advantageous, and substantially doubles the resistance to frictional deterioration, as determined by the following experiments.

In these experiments, test pieces, which are discs 12 mm. thick and 75 mm. diameter, some filled with packing material and some without packing material, are attached to a shaft and rotated in contact with sand paper. The sand paper applies a load to the discs, which are rotated at 250 r.p.m. by a motor shaft through a pulley. The reductions of weight of the test pieces by friction were as follows:

|  | With packing material | Without packing materia |
|---|---|---|
| Initial weight, gr | 83 | 81 |
| Weight after test, gr | 81.3 | 76.9 |
| Loss, gr | 1.70 | 4.05 |
| Attenuation factor, percent | 2.05 | 5.0 |

(B) By circulating cooling liquid inside of the soft rolls and the hard rolls, the following effects have been obtained. Namely, since the sealing piece and the hard rolls are in frictional engagement under a certain load, the surface temperature of the hard rolls becomes higher than the temperature within the vessel, so that the surface temperature of the soft rolls in rolling contact with the hard rolls will be considerably raised. This will shorten the life of the rolls and cause troubles due to heat distortion and the like. Furthermore excessive high temperature of the surfaces of the soft rolls will have an effect, largely on the material such as cloth, to be passed between the rolls.

Therefore, as in the device of present device, by cooling the hard rolls so as to limit their temperature, the life of the device may be increased substantially and the influence on the material to be treated may be considerably improved. The effect of cooling of the iron cores of the soft rolls, as in the present device, is very advantageous, in cooperation with the above-mentioned effect, in maintaining the adhesion of the outer shells of the soft rolls, with the iron cores thereof, at full value, and this is very important for preventing deterioration of the coverings of the soft rolls.

(C) In the present invention, the end faces of the sealing drum are not pressed by the side sealing plates, so that the latter may press the four end faces of the sealing rolls uniformly. Since each of four rolls rotates, the side sealing plates are moved in the axial direction on the sealing drum so that the side sealing plates always have adequate pressure engagement with the end faces of the rolls, even if these faces are worn during use. The effect of this construction is to enable long use of the sealing device, namely the sealing effect is considerably improved.

(D) The construction of FIG. 8a and 8b which keeps the lubricant in the sealing pieces has the effect that the frictional resistance between the sealing pieces and the hard rolls is reduced, the driving power required for the rolls is reduced, and the wear and tear required for the faces of the hard rolls is considerably reduced to very greatly increase the life of rolls.

(E) By providing a high pressure air chamber on the outside of the high pressure steaming chamber and by keeping the air pressure approximately equal to the pressure of the steaming chamber, the high temperature steam will not contact with the roll sealing portion. Therefore, even if the high pressure air leaks out from the elastic rolls in the advancing direction of the material, there is no deleterious effect on dyeing or other treatments. Thus, the selection of the elastic rolls and the materials for the sealing portions is facilitated. In the particular example of dyeing, wherein higher temperatures are required for steaming, all parts of hard dyeing fibers, hitherto considered impossible to be dyed, are subjected to a steaming treatment at 150° C., and any deep color may be completely dyed within a short time measured in "second" units. However, in usual system of sealing, since high pressure steam contacts directly with the sealing portion, if the steam ejects from this portion in the opposite direction to the advance of the cloth, the steam will condense on the surface of the cloth and insoluble serious dyeing spots will be generated thereon. This phenomenon will become the more dangerous the more the steam pressure increases. However, in present techniques, rubber rolls or the like must be used as the elastic rolls, and the heat resistance thereof is insufficient for long-time use at a temperature of more than 120° C.

In the present invention, since the high temperature steam from the steaming chamber is blocked by the high pressure air, all the above mentioned disadvantages are eliminated. And the usual defect that the cleaning of elastic roll is very hard, because of contamination of the elastic roll and its deep permeation into the interior of rubber, is eliminated in the present invention.

Further, large heat losses due to steam leakage from the roll sealing of the usual type is eliminated by the air system of the present invention, wherein the leaked steam may be recovered by the condenser, and, at the same time, no deterioration of the atmosphere is caused due to the leakage of steam.

We claim:

1. A pressure sealing device, for use at inlet and outlet openings of a high pressure steaming apparatus in which textiles are continuously treated with steam at high pressure and at high temperature, for introducing the textiles into the apparatus and withdrawing the textiles from the apparatus, through the openings, said device comprising, in combination, at least one pair of soft surface rolls rotatably mounted in engagement with each other for feeding the textiles relative to said openings, and for forming a seal against the internal pressure of said steaming apparatus; a sealing drum mounted at the associated opening and formed with a passage for the textiles between the opening and said soft surface rolls; at least one pair of hard surface rolls rotatably mounted, out of contact with each other, and each having rolling engagement with a respective soft surface roll and frictional engagement with said sealing drum; and end sealing plates slidably mounted on said sealing drum for movement axially of said rolls, said end sealing plates engaging the end faces of said rolls to complete said seal.

2. A pressure sealing device, as claimed in claim 1, in which the interiors of said rolls are formed with coolant chambers; and means operable to circulate coolant through said coolant chambers.

3. A pressure sealing device, as claimed in claim 1, including a flexible membrane secured to said apparatus at the associated opening and having an opening therein substantially mating with the passage in said sealing drum; flange means securing said membrane in saving relation to said apparatus; and flange means securing said sealing drum to said membrane for support by the latter.

4. A pressure sealing device, as claimed in claim 1, in which each soft surface roll includes a shaft and a substantially cylindrical iron core, said shaft and said core defining a coolant chamber; and a coating of soft rubber on the exterior surface of said iron core.

5. A pressure sealing device, as claimed in claim 1, in which each hard surface roll comprises a substantially cylindrical core of hard material and a shaft; said core and said shaft defining a coolant chamber therebetween.

6. A pressure sealing device, as claimed in claim 1, in which each soft roll has an exterior covering of soft material; at least the end portions of said exterior covering comprising material having self-lubricating properties.

7. A pressure sealing device, as claimed in claim 1, in which the portions of the surface of said sealing drum in frictional contact with said hard surface rolls are formed with respective elongated grooves; and lubricated sealing members each disposed in a respective groove to form a seal between said sealing drum and the associated hard surface roll.

8. A pressure sealing device, as claimed in claim 1, including a high pressure air chamber interposed between said sealing drum and the associated opening of said steaming apparatus; and means maintaining air under pressure in said chamber at a pressure of the order of the internal pressure of said apparatus.

References Cited

UNITED STATES PATENTS

| | | | |
|---|---|---|---|
| 1,633,121 | 6/1927 | Minton | 68—5–5X |
| 3,066,518 | 12/1962 | Fujihashi | 68—5–5X |
| 3,260,000 | 7/1966 | Schiffer | 68—5–5X |
| 3,299,676 | 1/1967 | Fujihashi | 68—5–5X |
| 3,320,776 | 5/1967 | Gorodissky et al. | 34—242X |
| 3,334,908 | 8/1967 | Starduck | 34—242X |
| 3,367,151 | 2/1968 | Fujihashi | 34—242X |

WILLIAM I. PRICE, Primary Examiner

U.S. Cl. X.R.

34—242